(12) United States Patent
Lopes

(10) Patent No.: US 6,215,862 B1
(45) Date of Patent: Apr. 10, 2001

(54) AUTOMATED TIME SYNCHRONIZATION OF PERIPHERAL DEVICES USING A TELEPHONE

(75) Inventor: Robert Joseph Lopes, Neshanic Station, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/218,799

(22) Filed: Dec. 21, 1998

(51) Int. Cl.[7] ...................................................... H04B 1/00
(52) U.S. Cl. .............................. 379/110.01; 379/102.01; 379/102.03
(58) Field of Search ................... 379/102.01, 102.03, 379/110.01, 102.12, 90.01, 93.05, 93.14; 455/67.3; 324/535; 340/310.01, 825.69; 368/46, 47, 49, 52

(56) References Cited

U.S. PATENT DOCUMENTS

| 5,089,814 | * | 2/1992 | DeLuca et al. | 340/825.49 |
| 5,677,895 | * | 10/1997 | Mankovitz | 379/102.03 |
| 5,917,272 | * | 6/1999 | Clark et al. | 310/343 |

FOREIGN PATENT DOCUMENTS

| 09096690 | * | 4/1997 | (JP) | G04G/5/00 |

* cited by examiner

Primary Examiner—Curtis Kuntz
Assistant Examiner—Melur Ramakrishnaiah
(74) Attorney, Agent, or Firm—Brown, Raysman, Millstein, Felder & Steiner LLP

(57) ABSTRACT

A telephone operates as a time server for synchronizing an appliance or peripheral by accessing a time service over telephone lines to obtain an accurate geographic time for the telephone, and by transmitting a synchronizing pulse to the appliance at a predetermined time to set the time function of the appliance.

25 Claims, 3 Drawing Sheets

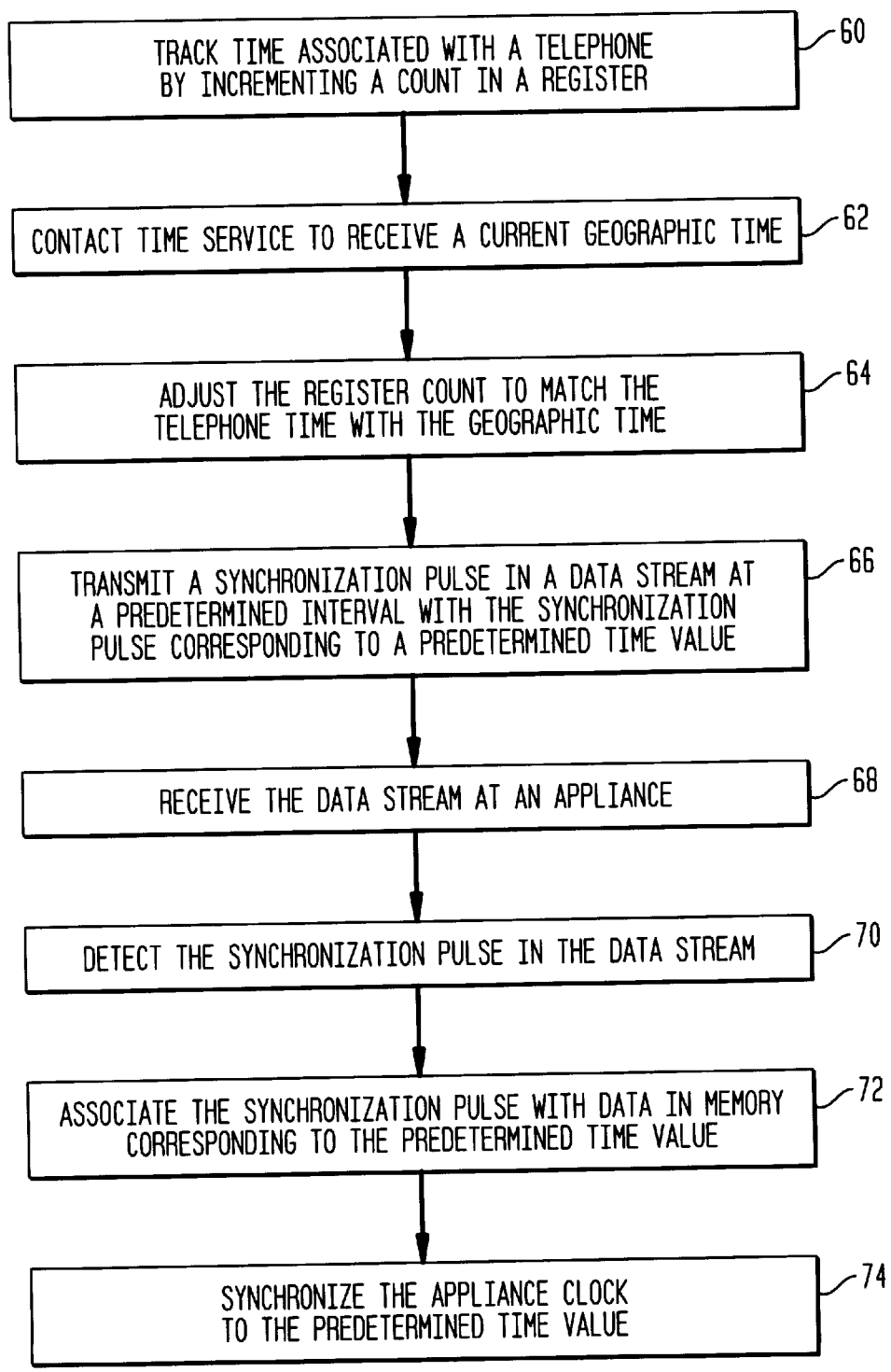

AUTOMATED TIME SYNCHRONIZATION OF PERIPHERAL DEVICES USING A TELEPHONE

BACKGROUND OF THE INVENTION

The present invention relates to time synchronization, and, more particularly, to a system and method for synchronizing the time of clocks and devices with clock functions using a telephone.

Computing devices are not limited to personal computers, and often are found in everyday appliances and tools, such as automobiles, microwave ovens, cellular phones, televisions, video cassette recorders (VCRs), audio/stereo systems, home alarm systems, etc. Timekeeping devices including digital clocks are a pervasive feature of our computerized society; for, many computing devices utilize a clock circuit or a timer during operation, for example, to activate at a predetermined point in time to operate an alarm or to control other devices, such as video recording devices.

Although the traditional term "clock" often refers to a timekeeping device with the sole function to maintain and display the time, many everyday devices often serve multiple functions, including maintaining and displaying the time, and so perform also as clocks. In particular, such devices may operate using electricity, and typically include electronics such as solid-state components and oscillators for maintaining the time. Accordingly, as defined herein, the term "clock" includes any devices having an electrically-powered timekeeping component.

With so many clocks available and presented to persons or organizations in everyday life, synchronization between multiple clocks is often required. For example, seasonal clock adjustments such as for Daylight Savings Time may be a daunting task in view of the multiple clocks within a home. Other problems affecting multiple clocks may be technical in nature. For example, losses of power to the oscillators for a significant period of time with limited or no power backup disrupt the timekeeping functions of the clocks. Further, many clocks may operate off of a common power source such as the electrical power to a house, and so a common loss of power often affects multiple clocks at once.

In addition, electronic clocks using oscillator crystals occasionally need to be reset due to accumulated drift during normal operation. Further, with constant timekeeping operation, clocks may also experience local oscillator aging effects, which in turn cause accumulated drift and reduce the accuracy of such clocks.

Accordingly, a need exists to counter the disruptive effects on the timekeeping functions of electronic clocks. In addition, a need exists to reset multiple clocks and timekeeping devices with greater efficiency.

In the prior art, clocks and other timekeeping devices are commercially available which automatically set themselves in response to received time transmissions. For example, clocks are available which are automatically set in response to the shortwave time transmissions from the WWV radio station of the National Institute of Standards and Technology (NIST). However, such clocks are not only costly for the average consumer but also such clocks would not be placed in abundance in household appliances or automobiles.

Another solution to automatically adjust clocks involves using portable Global Positioning System (GPS) receivers. However, the cost for such GPS receivers is still generally prohibitive for consumers, and such GPS receivers require an antenna with a clear view of the sky for satellite tracking, and so the use of such GPS receivers for clock synchronization is not practical in the case of multiple household clocks.

Accordingly, a need exists for a relatively inexpensive household or portable device which may operate with other devices with clocks to synchronize such clocks.

In the prior art, a line of VCRs produced by the "SONY" Corporation includes a time setting system, in which each VCR sets the clock therein in response to time codes carried within the vertical blanking intervals of conventional TV signals. However, such a clock setting solution may be relatively expensive to implement in multiple household appliances since each appliance would require a tuner or other TV signal decoding circuitry to read the time codes from the vertical blanking intervals, and each appliance would have to be able to receive such TV signals, for example, through bulky coaxial cables.

Thus, there is a need for a relatively simple and inexpensive system which communicates with multiple appliances to set the clocks therein.

Also, U.S. Pat. No. 5,600,711 to Yuen discloses a system for setting the time on remote appliances, which requires a telephone connection to the remote appliance and a time setting device, and with a predetermined command sequence including a time value to be sent to address and set each remote appliance. Each remote appliance thus addressed receives and adopts the time value sent over the telephone lines. In another system described in U.S. Pat. No. 5,805,530 to Youngberg, a master clock device, which is not a telephone, transmits time information in time codes as well as accuracy information via infrared or radio frequency (RF) waves. However, implementation of such command sequences and communication protocols for sending and receiving such command sequences, time codes, time values, and accuracy information increases the complexity of the components.

A need exists for a relatively simple system for synchronizing the time of a plurality of appliances without the complexity of transmitting and receiving command sequences and accuracy information to the appliances.

SUMMARY OF THE INVENTION

A telephone serves as a time server for synchronizing an appliance by accessing a time service over telephone lines to obtain an accurate geographic time for the telephone, and by transmitting a synchronizing pulse to the appliance at a predetermined time to set the time function of the appliance.

BRIEF DESCRIPTION OF THE DRAWINGS

FIG. 3 illustrates a flowchart of the operation of the disclosed system.

DETAILED DESCRIPTION OF THE PREFERRED EMBODIMENT

Figure 1:
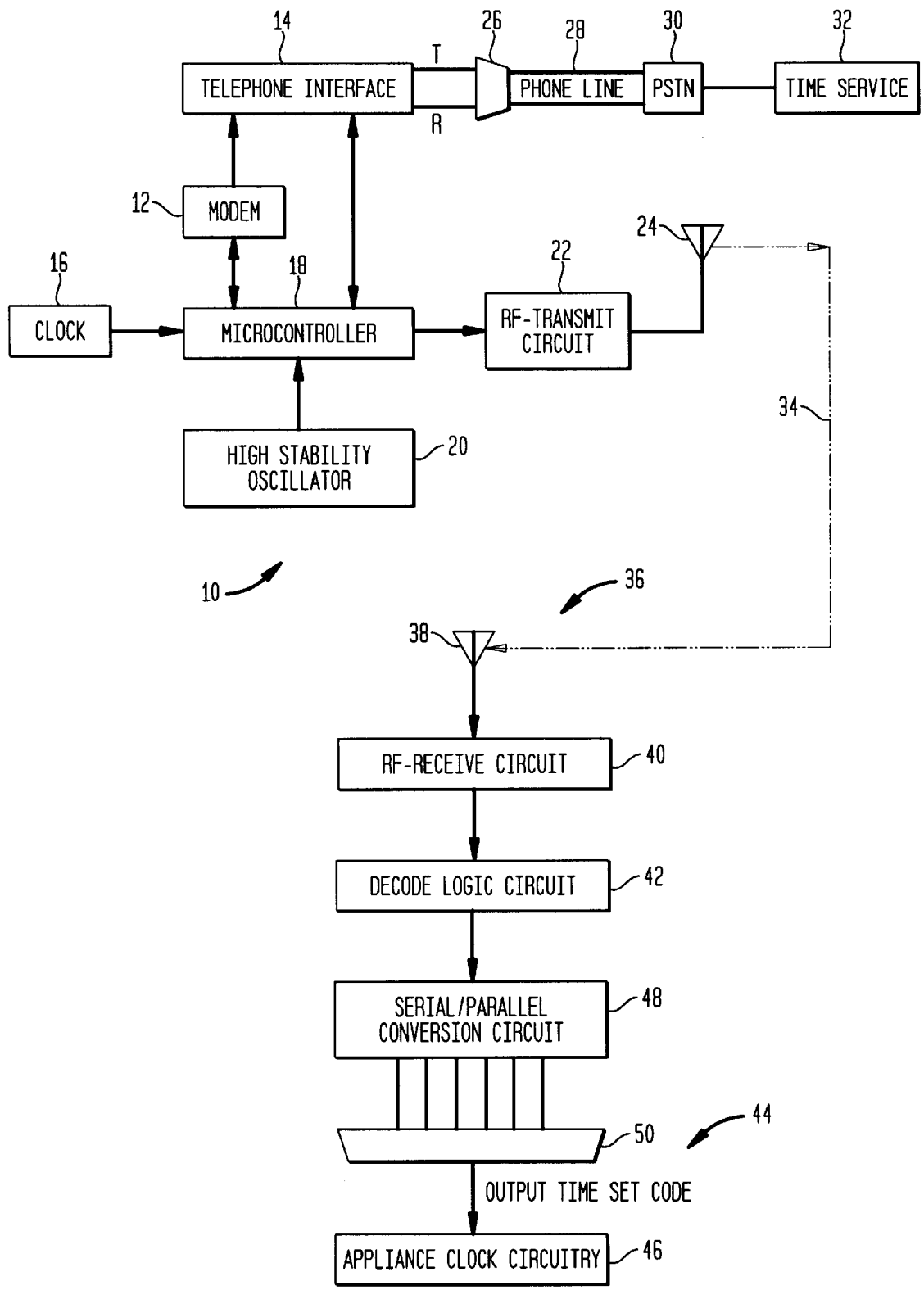
FIG. 1 illustrates the disclosed time synchronization system.

Referring now to FIG. 1, a telephone 10 and a system and method using such a telephone 10 are shown. The telephone 10 includes telephone circuitry 12 such as a modem which may include or is connected to a telephone interface 14. The telephone 10 also includes a clock 16 using, for example, an oscillator such as a quartz oscillator, for providing clock signals to a microcontroller 18, which is connected to and which operates the modem 12 and/or to the telephone interface 14. The microcontroller 18 is also connected to a high stability oscillator 20, such as an oven-controlled oscillator, for performing the clock synchronization described herein. A transmitter 22, such as a radio frequency (RF) transmit circuit, is connected to or includes an antenna 24.

Through the telephone interface 14 and a connector 26, such as a standard telephone jack connecting the tip (T) and ring (R) wires, the telephone 10 is connected to a telephone line 28 and thence to a communications network, such as a public switched telephone network (PSTN) 30 and/or through wireless or fiber optic telephone communication equipment. Through the PSTN 30, the telephone 10 is connectable to other systems, such as a time service 32 for performing the clock synchronization functions described herein. The time service 32 may be a telephone-based time reporting service such as those provided by local telephone companies. Alternatively, the NIST provides time reporting services from which the telephone 10 and components thereof receive a time signal or value indicating the current time at the geographic location of the telephone 10. In other alternative embodiments, the telephone 10 may receive a synchronization signal over the telephone lines 28, with the synchronization signal being used by the telephone 10 and/or components thereof to determine the time within a desired accuracy.

In further alternative embodiments, the time service 32 may be a network-based time service such as a time-query function available through the Internet. Accordingly, the telephone circuitry 12 and/or the microcontroller 18 may include additional components and capabilities, such as a modem and appropriate network/Internet communication protocol hardware and/or software.

The telephone 10, controlled by the microcontroller 18, periodically dials out and/or establishes a telephonic connection with the time service 30 via the telephone lines 28, and thence obtains the time from the time service 32, which typically has an accuracy resolution of about 50 ms. Greater accuracy may be obtained as desired, for example, from the NIST time reporting services in Boulder, Colorado. The microcontroller 18 may also apply known line protocols to improve the time transfer resolution from such remote time services 32 to within a few milliseconds.

The local time value associated with the telephone 10 and derived or obtained from the time service 32 is sent to the microcontroller 18, for storage in a register or other locations in memory. The telephone 10 may also have a time function using the clock 16 in which a count in a register or memory is incremented to measure time intervals and/or to maintain the local time at the telephone 10 in the register, and the microcontroller 18 may also adjust the time function of the telephone 10 using the received local time value.

In alternative embodiments, the transmitter 22 may optionally be incorporated into the telephone 10 or may be an accessory to the telephone 10, which connects to the microcontroller 18 through a port in the housing of the telephone 10. For example, the transmitter 22 may be coupled to the telephone 10 through a standard telephone jack, and so may be coupled to the microcontroller 18 through the telephone interface 14. Alternatively, the telephone 10 may be a mobile telephone or a cellular telephone which typically has an antenna 24, so the transmitter 22 and the antenna 24 thereof may be incorporated into the transmitting components of the mobile or cellular telephone.

RF signals 34 are broadcast from the transmitter 22 at a frequency of, for example, 433 MHz to operatively connect the microcontroller 18 to at least one appliance 36 or peripheral device within a desired communication range, such as a circular area having a few hundred foot radius, barring interference and obstructing physical structures. For example, within the desired communication range, the appliance or peripheral device 36 may be a clock, a microwave oven, a VCR, an audio/stereo system, a personal computer, a facsimile machine, children's toys, or other devices maintaining and using timing devices. Such appliances 36 may be in a house or automobile, such as a car or recreational vehicle. Accordingly, it is to be expected that the telephone 10 is associated with the at least one appliance 36 in order to reset the clock of the appliance 36. That is, for appliances 36 in a house, the telephone 10 associated with the appliances 36 is to be the main telephone of the house, as opposed to auxiliary telephones such as cellular telephones or car telephones which typically leave the desired range of the RF waves 34 and so cannot communicate with the appliances 36.

Using the microcontroller 18, the telephone 10 generates a clock setting pulse, which is locally broadcast via the signals 34 from the transmitter 22 to the at least one appliance 36. Each appliance 36 includes an antenna 38 connected to a receiver 40, such as an RF-receive circuit, tuned to receive and process the signals 34 including the clock setting pulse. A decode logic circuit 42 detects and decodes the clock setting pulse to be output as a time set code 44 to appliance clock circuitry 46. The decode logic circuit 42 may include or be connected to memory for storing, for example, a table or a register value of one or more time set codes corresponding to different clock setting pulses as synchronization signals. Upon receiving the clock setting pulse, the corresponding time set code 44 is retrieved from memory. The appliance clock circuitry 46 maintains the clock of the appliance 36, such as the timer of a VCR, for example, by storing a current local clock value in a memory. In response to the time set code 44, the appliance clock circuitry 46 adjusts or resets a local clock accordingly.

The decode logic circuit 42 may generate a serial output signal as the time set code 44, and the appliance clock circuitry 46 may be adapted to receive and process such a serial time set code 44. Alternatively, for such appliance clock circuitry 46 adapted to receive data signals from parallel line or data connections, such as a parallel bus or port, an optional serial/parallel conversion circuit 48 may be used to convert the decoded time set code 44 from a serial format to a parallel format, and so to provide such a parallel time set code 44 through a parallel bus or port 50 to the appliance clock circuitry 46.

In one embodiment, the clock setting pulse may correspond to a first desired time, such as midnight. Upon detecting the specific clock setting pulse, each appliance 36 automatically sets its local clock to the first desired time, which may be stored in memory associated with the decode logic circuit 42. In this manner, the clock setting pulse in the signals 34 may be, for example, a single square wave on a specific radio frequency, or a specific sequence of square wave pulses which correspond to but do not encode the desired time values. The appliance 36 may regularly or continually detect for the specific clock setting pulse, and, upon receipt of the pulse, the appliance 36 enters a specific clock adjusting procedure to tune the local clock to the desired time value.

In another embodiment, the telephone 10, through the microcontroller 18, may generate specific synchronization codes for specific times during the day. Such synchronization codes are then transmitted from the transmitter 22 at specific intervals; for example, a first synchronization code corresponding to three A.M. is transmitted at that time, while a second synchronization code corresponding to four A.M. is transmitted at that time. After polling or detecting for the receipt of such synchronization codes, the decoder logic circuit 42 of each appliance 36 decodes such synchronization codes to retrieve the corresponding time from memory, and then resets the respective local clock to the corresponding time. Alternatively, the appliance clock circuitry 46 may have a default setting value, such as 12 A.M., which is the typical time setting defaulted to upon a power loss. The synchronization pulse or code from the transmitter 22 may signal the appliance clock circuitry 46 to set to the default setting. Accordingly, the telephone 10 may operate to transmit the synchronization pulse or code at the default setting of one or more of the appliances 36.

Illustrative Implementation

Figure 2:
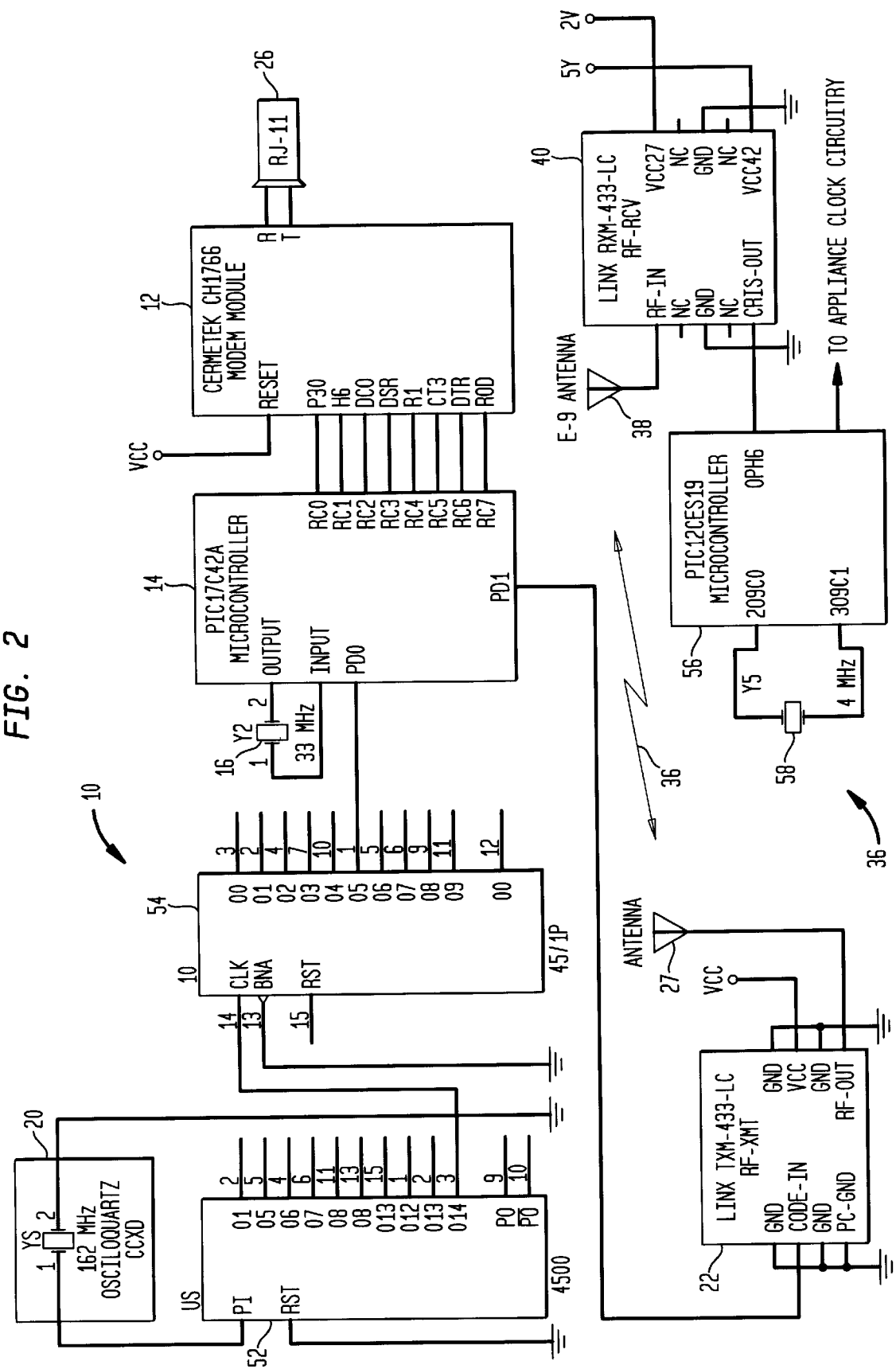
FIG. 2 illustrates an illustrative implementation of the system of FIG. 1.

As shown in FIG. 2, the disclosed telephone 10 and appliance 36 may be implemented with relatively few components. For example, in an illustrative implementation, the modem 12 may be a CERMETEK CH1788 modem module incorporating the telephone interface 14, having a RESET pin connected to a voltage source $V_{cc}$, and having tip and ring connections to a standard RJ-11 jack as the connector 26. The microcontroller 14 may be a PIC17C42A microcontroller for controlling the telephone 10 to perform the clock synchronization of the appliance 36. For example, pins labeled RC0 to RC7 of the PIC17C42A microcontroller 14 may be respectively connected to pins labeled RX0, HS, DC0, DSR, R1, CTS, DTR, and RX0 of the CERMETEK CH1788 modem module 12. The clock 16 for typical operation of the microcontroller 14 may be a 33 MHz quartz oscillator connected to pins labeled CKIN and CKOUT, for clock input and clock output, respectively, of the PIC17C42A microcontroller 14.

The high stability, oven-controlled crystal oscillator 20 may be a 1.9162 MHz OSCILOQUARTZ OCXO device connected between ground and the PIC17C42A microcontroller 14. In addition, a clock generation circuit includes logic circuits 52, 54 acting as a divider circuit for generating a precise 60 Hz pulse train from the highly stable pulses from the oven controlled crystal oscillator 20. The clock generation circuit is connected to the oscillator 20 to generate the highly stable clock signal used by the microcontroller 14 to perform the clock synchronization of the appliance 36. The logic circuit 52 may be a Model 4560 integrated circuit (IC) with pin PI connected to the oscillator 20, and with pin RST connected to ground. The logic circuit 54 may be a Model 4917 IC having pin CLK connected to pin 3 labeled Q14, and having pin ENA connected to ground. Also, pin 1 labeled Q5 of the logic circuit 54 is connected to pin RDO of the PIC17C42A microcontroller 14 to provide the stable clock signal from the oscillator 20 for clock synchronization. Alternatively, the microcontroller 14 may be a programmable logic array (PLA) and/or an application specific integrated circuit (ASIC) which may be connected to a separate telephone microprocessor which controls the telephone functions of the telephone 10.

The RF-transmit circuit 22 may be a LINX TXM-433-LC RF-XMT device transmitting through the antenna 24 at 433 MHz, and having a DATA-IN pin connected to an RD1 pin of the PIC17C42A microcontroller 14. The RF-OUT pin of the LINX TXM-433-LC RF-XMT device 22 is connected to the antenna 24, while the ground pins Gnd and sdGnd are connected to ground, and the VCC pin is connected to a voltage source $V_{CC}$.

Referring to the illustrative embodiment shown in FIG. 2, the receiving section of the appliance 36 includes a LINX RXM-433-LC RF-RCV device as the RF-receive circuit 40, with an RF-IN pin connected to the antenna 38 for receiving the 433 MHz signal from the RF-transmit circuit 22. The ground pins Gnd are connected to ground, and the pins VCC27 and VCC42 are connected to 3 VDC and 5 VDC voltage sources, respectively, depending on the supply voltage provided for the LINK RXM433-LC RF-RCV device 40.

The DATA-OUT pin of the LINX RXM-433-LC RF-RCV device 40 is connected to pin 5, labeled GP1, of a PIC12CE519 microcontroller 56, which includes the decode logic circuit 42 and optionally the serial/parallel conversion circuit 48 shown in FIG. 1. A clock 58, such as a 4 MHz oscillator, is connected to pins 2 and 3, labeled OSC0 and OSC1, respectively, for operating the PIC12CE519 microcontroller 56 to decode the data from the signals 34 to generate the time set code for output to the appliance clock circuitry 46.

It is to be understood that other components may be used to implement the elements of FIG. 1 in addition to or instead of the example components shown in FIG. 2.

Method of Operation

In use, the telephone 10 and appliance 36 operate as shown in FIG. 3, in which the telephone 10 tracks an internally associated time in step 60 by incrementing a count in a register maintained in memory incorporated in or connected to the microcontroller 18. The microcontroller 18 is programmed to operate the telephone 10 to contact the time service 32 in step 62 at predetermined intervals to receive a current geographic time. In response to the current geographic time, the telephone 10 adjusts the register count in step 64 to match the telephone time with the geographic time, and the telephone 10 transmits a synchronization pulse as a clock setting pulse in a data stream in the signals 34 from the RF-transmit circuit 22 and the antenna 24 in step 66 at a predetermined interval, with the synchronization pulse corresponding to a predetermined time value.

At the appliance 36, the data stream is received in step 68 through the antenna 38 and RF-receive circuit 40, and the synchronization pulse is detected in the data stream in step 70 by the decode logic circuit 42. The appliance 36 associates the synchronization pulse with data in memory of the decode logic circuit 42 corresponding to the predetermined time value in step 72, and the appliance 36 then synchronizes the appliance clock maintained by the appliance clock circuitry 46 to the predetermined time value in step 74.

Numerous Advantages

By implementing the disclosed invention in a telephone, numerous advantages are attained to accurately synchronize multiple appliances to a common time value. For example, while many homes may be without a VCR or a microwave oven, the telephone is a generally ubiquitous appliance. In addition, electronic telephones typically include a fairly stable quartz oscillator such as the high stability oscillator 20, and so may be a substantially more reliable timekeeping device from which to control the adjustments to other timekeeping devices. Furthermore, many telephones are wired to a PSTN 30, and such telephones obtain operating power directly from the PSTN 30, and not from the power grid of the home. Accordingly, the telephone 10 typically does not have a common power source with the appliances 36, and so the telephone 10 is not vulnerable to power outages and disruptions in functions, including timekeeping operations, as are electrical appliances. Accordingly, after a power outage, when the electrical appliances 36 are re-activated to perform normal functions, such normal functions include monitoring for the synchronization pulse from the telephone 10, and such synchronization is not dependent on the appliance time; that is, the appliance time can be adjusted at any time in response to receiving the synchronization pulse from the telephone 10.

By the foregoing a novel and unobvious time adjustment device and method has been disclosed by way of the preferred embodiment. However, numerous modifications and substitutions may be had without departing from the spirit of the invention. For example, while the preferred embodiment discusses using a telephone, it is wholly within the preview of the invention to contemplate a separate stand-alone device having telephone or modem capabilities solely for telephonically contacting time services 32 and for remotely adjusting multiple clocks in appliances 36 in the manner as set forth above. Accordingly, the invention has been described by way of illustration rather than limitation.

What is claimed is:

1. A telephone comprising:
    telephone circuitry for establishing a connection to a time service over a telephone network;
    a transmitter for transmitting a synchronization signal over a wireless channel to an appliance at a predetermnined time to set the local time of the appliance to the predetermined time corresponding to the synchronization signal, the synchronization signal corresponding to but not encoding a value of the predetermined time; and
    a microcontroller for controlling the telephone to access the time service using the telephone circuitry to obtain a substantially accurate geographic time associated with the telephone, and for generating the synchronization signal at the predetermined time relative to the accurate geographic time.

2. The telephone of claim 1, wherein a power source of the telephone is independent of a power source of the appliance.

3. The telephone of claim 2, wherein the power source of the telephone is provided through a public switched telephone network.

4. The telephone of claim 1, further comprising:
    an oven-controlled oscillator for accurately maintaining the accurate geographic time.

5. The telephone of claim 1, wherein the transmitter transmits the synchronization signal over a predetermined frequency for detection by the appliance.

6. The telephone of claim 1, wherein the microcontroller performs a line protocol procedure to accurately receive the geographic time from the time service.

7. An apparatus comprising:
    telephone circuitry for establishing a connection to a time service over a telephone network;
    a transmitter for transmitting a synchronization signal over a wireless channel to an appliance at a predetermined time to set the local time of the appliance to the predetermined time corresponding to the synchronizing signal, the synchronization signal corresponding to but not encoding a value of the predetermined time;
    a microcontroller for accessing the time service using the telephone circuitry to obtain a substantially accurate geographic time associated with the apparatus, and for generating the synchronization signal at the predetermined time relative to the accurate geographic time;
    a clock for measuring time intervals; and
    wherein the microcontroller, responsive to the time intervals, initiates a request procedure to periodically contact the time service to obtain the substantially accurate geographic time.

8. The telephone of claim 7, wherein the microcontroller, during the request procedure, controls the telephone circuitry to establish the connection to the time service to periodically contact the time service.

9. The telephone of claim 7, wherein the microcontroller, responsive to the time intervals, periodically adjusts a telephone time value associated with the microcontroller to be the substantially accurate geographic time.

10. An appliance comprising:
    a decoding logic circuit, responsive to receiving one of a plurality of different predetermined synchronization signals over a wireless channel from a telephone, each of the different synchronization signals corresponding to a predetermined time value but not encoding the predetermined time value, for generating a time set signal by associating the received synchronization signal with its corresponding predetermined time value; and
    appliance clock circuitry for maintaining a local time, and responsive to the time set signal for resetting the local time to the predetermined time value.

11. The appliance of claim 10, wherein a power source of the appliance is independent of a power source of the telephone.

12. The appliance of claim 10, further comprising:
    a wireless reception circuit tuned to receive the predetermined synchronization signal over the wireless channel.

13. The appliance of claim 10, further comprising:
    a memory for storing the predetermined time value corresponding to the synchronization signal; and
    wherein the decoding logic circuit, responsive to the synchronization signal, retrieves the stored predetermined time value.

14. A system for synchronizing a clock device, the system comprising:
    a telephone having:
        telephone circuitry for establishing a connection to a time service over a telephone network;
        a transmitter for transmitting a synchronization signal over a wireless channel at a predetermined time, the synchronization signal corresponding to but not encoding a value of the predetermined time; and
        a microcontroller for controlling the telephone to access the time service using the telephone circuitry to obtain an accurate geographic time associated with the telephone, and for generating the synchronization signal at the predetermine time relative to the accurate geographic time; and
    an appliance having:
        a decoding logic circuit, responsive to receiving a predetermined synchronization signal over the wireless channel from the telephone corresponding to a predetermined time value, for generating a time set signal; and
        appliance clock circuitry for maintaining a local time in the clock device associated with the appliance, the appliance clock circuitry being responsive to the time set signal for resetting the local time to the predetermined time value.

15. The system of claim 14, wherein a power source of the telephone is independent of a power source of the appliance.

16. The system of claim 14, wherein the microcontroller performs a line protocol procedure to accurately receive the geographic time from the time service.

17. The system of claim 14, wherein the appliance includes:
    a wireless reception circuit tuned to receive the predetermined synchronization signal over the wireless channel.

18. The system of claim 14, wherein the appliance includes a memory for storing the predetermined time value corresponding to the synchronization signal; and wherein the decoding logic circuit, responsive to the synchronization signal, retrieves the stored predetermined time value.

19. A system for synchronizing a clock device, the system comprising:

a telephone having:
- telephone circuitry for establishing a connection to a time service over a telephone network;
- a transmitter for transmitting a synchronization signal over a wireless channel at a predetermined time, the synchronization signal corresponding to but not encoding a value of the predetermined time;
- a microcontroller for accessing the time service using the telephone circuitry to obtain an accurate geographic time associated with the telephone, and for generating the synchronization signal at the predetermined time relative to the accurate geographic time;

a clock for measuring time intervals; and wherein the microcontroller, responsive to the time intervals, initiates a request procedure to periodically contact the time service to obtain the substantially accurate geographic time; and an appliance having:
- a decoding logic circuit, responsive to receiving a predetermined synchronization signal over the wireless channel from the telephone corresponding to a predetermined time value, for generating a time set signal; and
- appliance clock circuitry for maintaining a local time in the clock device associated with the appliance, the appliance clock circuitry being responsive to the time set signal for resetting the local time to the predetermined time value.

20. The system of claim 19, wherein the microcontroller, during the request procedure, controls the telephone circuitry to establish the connection to the time service to periodically contact the time service.

21. A method for synchronizing a clock device in an appliance storing a local time, the method comprising:

using a microcontroller to cause a telephonic device to establish a connection with a time service over a telecommunication network at a predetermined time;

receiving a substantially accurate geographic time associated with the telephonic device from the time service; and transmitting a synchronization signal over a wireless channel to an appliance at the predetermined time to thereby set the local time of the appliance to the predetermined time corresponding to the synchronization signal, the synchronization signal corresponding to but not encoding a value of the predetermined time.

22. The method of claim 21, comprising measuring time intervals and using the microcontroller, responsive to the time intervals, to initiate a request procedure to periodically contact the time service to obtain the substantially accurate geographic time.

23. The method of claim 21, comprising periodically adjusting a telephonic device time value associated with the microcontroller to be the substantially accurate geographic time.

24. The method of claim 21, comprising the appliance receiving the synchronization signal and setting the local time of the appliance to the predetermined time corresponding to the synchronization signal.

25. The method of claim 24, comprising the appliance setting the local time by associating the synchronization signal with the predetermined time.

* * * * *